United States Patent
Bird et al.

(10) Patent No.: US 7,003,425 B2
(45) Date of Patent: Feb. 21, 2006

(54) COMPONENT TEMPERATURE MEASURING METHOD

(75) Inventors: Colin Bird, Derby (GB); Colin J Parrish, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/856,992

(22) Filed: Jun. 1, 2004

(65) Prior Publication Data

US 2004/0267850 A1 Dec. 30, 2004

(51) Int. Cl.
G01K 17/00 (2006.01)
G06F 15/00 (2006.01)

(52) U.S. Cl. ..................................................... 702/136
(58) Field of Classification Search ................ 702/130, 702/134–136; 374/1, 2, 100, 121; 250/339.04
See application file for complete search history.

(56) References Cited

U.S. PATENT DOCUMENTS

| | | | | |
|---|---|---|---|---|
| 4,880,314 A | * | 11/1989 | Kienitz | 374/129 |
| 5,125,739 A | | 6/1992 | Suarez-Gonzalez | |
| 5,326,173 A | * | 7/1994 | Evans et al. | 374/128 |
| 5,688,051 A | | 11/1997 | King | |
| 6,027,244 A | * | 2/2000 | Champetier et al. | 374/130 |
| 2003/0111615 A1 | | 6/2003 | Benne | |
| 2003/0236642 A1 | * | 12/2003 | Timans | 702/99 |

FOREIGN PATENT DOCUMENTS

FR 2 365 108 AB 9/1976

* cited by examiner

Primary Examiner—Bryan Bui
Assistant Examiner—Demetrius Pretlow
(74) Attorney, Agent, or Firm—W. Warren Taltavull; Manelli Denison & Selter PLLC

(57) ABSTRACT

A method of measuring temperature of a component capable of emitting thermal radiation and reflecting background radiation having the steps of: providing a pyrometer for measuring the radiation from the component, characterised by coating a part of the component with a first emissivity coating and a part of the component with a different and second emissivity coating, each with known emissivities $E_H$ and $E_L$ respectively, recording a first radiation measurement from the first emissivity coating $R_H$ and a second radiation measurement from the second emissivity coating $R_L$, then calculating the true radiation $R_{Blade}$ from the component from the equation $$R_{Blade} = \frac{\left(\frac{R_H}{E_H} - \frac{R_L}{E_H}\left(\frac{1-E_H}{1-E_L}\right)\right)}{\left(1 - \frac{E_L}{E_H}\left(\frac{1-E_H}{1-E_L}\right)\right)}$$

and relate the $R_{Blade}$ value to the true component temperature by calibration of the pyrometer.

7 Claims, 2 Drawing Sheets

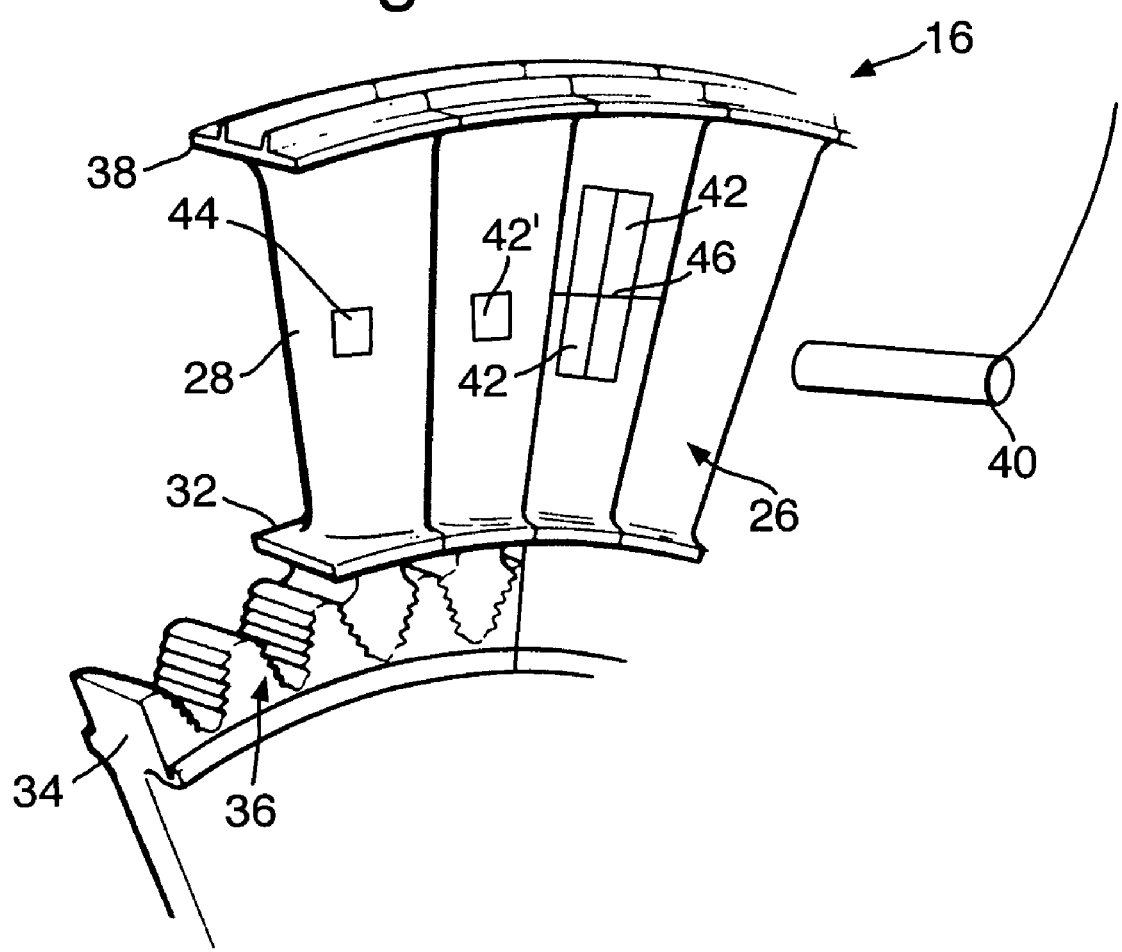

COMPONENT TEMPERATURE MEASURING METHOD

The present invention relates to radiative temperature measurement.

Radiative temperature measurement methods used in many industries take such forms as radiation pyrometry and thermal imaging. A frequent problem with radiative temperature measurements is the background radiation from another object. For example, when measuring the temperature of a first stage turbine rotor of a gas turbine engine, up to 70% of the measured radiation can be due to reflections from the combustor and surrounding hardware, leading to errors of up to 150° C.

U.S. Pat. No. 5,125,739 discloses an optical pyrometer that uses three spectral bands for a temperature calculation of a target, such as a turbine blade of a gas turbine engine, whose output signal is compensated for spurious radiation reflected by the target from another single source, such as a combustor flame. The target temperature is optically distinguished from background radiation by dividing a received optical beam into three spectral components comprising emitted and reflected radiation. A controller computes the measured power in each band as a function of the emitted power by the target and a ratio of reflected power in adjacent bands to give signals of reflection corrected radiation. These are used with the reflected power ratios to determine values of temperature in adjacent bands. The difference between these computed temperatures is iteratively adjusted until the difference therebetween is approximately equal to a preselected value. However, this method is limited to where there is a single source of background radiation. In a gas turbine engine, for example, there are multiple sources of reflected radiation at multiple temperatures from surrounding architecture and this method is therefore not capable of distinguishing the true temperature of the object being measured.

The present invention provides a solution to this problem for the general case of any number of reflection sources each with an unknown temperature.

Therefore it is an object of the present invention to provide a method of measuring temperature of a component capable of emitting thermal radiation and reflecting background radiation comprising the steps of: providing a pyrometer for measuring the radiation from the component, characterised by coating a part of the component with a first emissivity coating and a part of the component with a different and second emissivity coating, each with known emissivities $E_H$ and $E_L$ respectively, recording a first radiation measurement from the first emissivity coating $R_H$ and a second radiation measurement from the second emissivity coating $R_L$, then calculating the true radiation $R_{Blade}$ from the component from the equation $$R_{Blade} = \frac{\left(\frac{R_H}{E_H} - \frac{R_L}{E_H}\left(\frac{1-E_H}{1-E_L}\right)\right)}{\left(1 - \frac{E_L}{E_H}\left(\frac{1-E_H}{1-E_L}\right)\right)}$$

and relate the $R_{Blade}$ value to the true component temperature by calibration of the pyrometer. A pyrometer or equivalent instrument will measure the sum of radiation emitted from a component due to its temperature plus ambient background radiation reflected from the component surface. The contribution to the measured radiation value due to the component temperature is proportional to its surface emissivity. The contribution to the measured radiation value due to ambient background radiation reflected from the component surface is proportional to its reflectivity, which is equal to (1-emissivity). Coatings of differing emissivities therefore introduce differing proportions of emitted and reflected radiation into the measurement. Where these emissivities are known, then the individual contributions from these two sources may be separated and the true component temperature calculated.

Preferably, the coatings of different emissivities are coated on an isotherm of the component and the pyrometer measures the radiation on the isotherm.

Alternatively, a further coating of the same emissivity as one of the other coatings is coated on the component for a further calculation of the true radiation $R_{Blade}$.

Alternatively, a further coating of different emissivity from either coating is coated on the component for a further calculation of the true radiation $R_{Blade}$.

Preferably, the component is a component of a gas turbine engine. Alternatively, the component is a component of any one of the group comprising a furnace, a kiln, an incinerator or a machine bearing.

Alternatively, the component is a component of a process of any one of the group comprising rapid thermal processing, molecular beam epitaxy, chemical vapour deposition, metal organic chemical vapour deposition, physical vapour deposition, materials processing or thermal shock testing.

The present invention will be more fully described by way of example with reference to the accompanying drawings in which:

FIG. 2 is view on a part of a first rotor stage of a high pressure turbine of the gas turbine engine.

Figure 1:
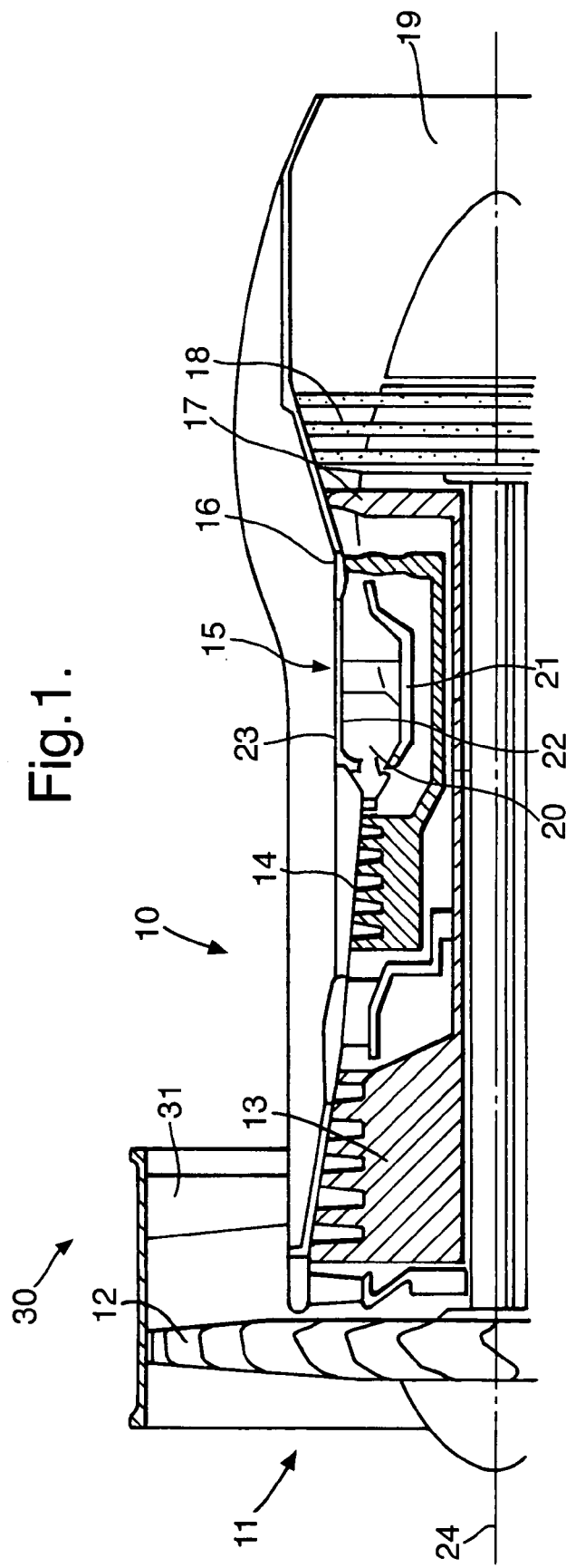
FIG. 1 is a schematic section of a ducted fan gas turbine engine.

With reference to FIG. 1, a ducted fan gas turbine engine generally indicated at 10 has a principal and rotational axis 24. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17 and 18 before being exhausted through the nozzle 19 to provide additional propulsive thrust. The high, intermediate and low-pressure turbines 16, 17 and 18 respectively drive the high and intermediate pressure compressors 14 and 13 and the fan 12 by suitable interconnecting shafts.

The fan 12 is circumferentially surrounded by a structural member in the form of a fan casing 30, which is supported by an annular array of outlet guide vanes 31.

It is desirable to measure the temperature of any one of the hot components of the engine to assist in determining service requirements and compare to design temperature values.

Referring now to FIG. 2, the high pressure turbine 16 comprises an annular array of radially extending turbine blades 26. Each blade 26 is conventional in both configuration and operation, having an aerofoil portion 28 supported on a platform 32 and attached to a disc 34 by dovetail joint 36. The radially outer portion of the blade 26 supports a shroud 38 provided to minimise gas leakage around the turbine stage. The turbine 16 is immediately downstream of the combustor 15 although it is common for an annular array of outlet guide vanes to be disposed therebetween. The present invention is also applicable to temperature measurements on any stage in the IP and LP turbines 17 and 18.

To measure the true temperature of a blade 26 in accordance with the present invention the blade is coated with two discrete coatings 42, 44 of differing emissivities, one high one low. A radiation pyrometer 40 is installed to view the upstream (or downstream) surface of the turbine stage 16 and is connected to processing equipment (not shown). A suitable radiation pyrometer 40 is a Rotamap 1 or 2 scanning pyrometer as manufactured by Rotadata Ltd, Derby, UK. During a constant engine operating mode, the blade 26 achieves a stable temperature, and emits thermal radiation in accordance with the Planck equation. The blade 26 also reflects spurious radiation originating from the combustor 15 and other surrounding engine components.

As the two coatings have different emissivities there will therefore be differing amounts of thermal radiation from the component and reflected radiation from each coating type. As the emissivities are known the blade radiation and reflected radiation are separable and a measurement of the component temperature is then calculable.

Where the signal corresponding to spurious radiation from the combustor and surroundings is $R_{Surr}$ and measured signal corresponding to blade emission for a given emissivity is $E \cdot R_{blade}$, then the measured signal due to emission from the high emissivity coating is $R_{High}=E_{THigh}R_{Blade}+(1-E_{high})R_{Surr}$, and the measured signal corresponding to emission from the low emissivity coating is $R_{Low}=E_{TLow}R_{Blade}+(1-E_{Low})R_{Surr}$, therefore giving:

$$R_{Blade} = \frac{\left(\frac{R_H}{E_H} - \frac{R_L}{E_H}\left(\frac{1-E_H}{1-E_L}\right)\right)}{\left(1 - \frac{E_L}{E_H}\left(\frac{1-E_H}{1-E_L}\right)\right)}$$

For a specific example, where the high emissivity coating (42) $E_{Thigh}=0.85$ and the low emissivity coating (42) $E_{TLow}=0.45$, for a true blade temperature of 1000° C. in a high radiation environment, the pyrometer may return a signal of 354 mV from the high emissivity coating (corresponding to an erroneous uncorrected temperature of 1150° C.) and a signal of 992 mV from the low emissivity coating. The true signal due to the blade emission is therefore:

$$R_{Blade} = \frac{\left(\frac{354}{0.85} - \frac{992}{0.85}\left(\frac{1-0.85}{1-0.45}\right)\right)}{\left(1 - \frac{0.45}{0.85}\left(\frac{1-0.85}{1-0.45}\right)\right)} = 115 \text{ mV},$$

which corresponds via the instrument calibration to the true blade temperature of 1000° C.

Thus a method of measuring temperature of a component 26 capable of emitting thermal Planck radiation and reflecting background radiation comprises the steps of providing a pyrometer 40 for measuring the radiation from the component 26, characterised by coating a part of the component 26 with a high emissivity coating 42 and a part of the component 26 with a low emissivity coating 44, each with known emissivities $E_H$ and $E_L$ respectively, recording a first temperature measurement from the high emissivity coating 42 $R_H$ and a second temperature measurement from the low emissivity coating 44 $R_L$, then calculating the radiation $R_{Blade}$ of the component 26 from the above equation to find the corresponding component temperature using the calibration of the pyrometer.

In an alternative embodiment, shown on FIG. 2, of the present invention the high and low emissivity coatings 42, 44 are coated onto separate blades 26 or other components to be temperature measured.

It should be appreciated by the skilled artisan that more than two coatings could be used, each coating having a different emissivity. In this way a further true temperature is calculated and may be used for comparison or mapping of true temperatures over the surface of the component being measured.

Whilst the specific embodiment described above recites the specific use of high emissivity coating 42 $E_{Thigh}=0.85$ and the low emissivity coating 44 $E_{TLow}=0.45$, it should be appreciated that the present invention is realised where there is any difference in emissivities.

It is an important aspect of the present invention that the method should comprise the coatings 42, 44 of different emissivities being coated on an isotherm 46 of the component 26. This is important so that the pyrometer 40 measures the radiation from the two coatings, on the isotherm 46, that are subject to the same true temperature.

It should be appreciated by the skilled artisan that the method of the present invention is equally applicable to measuring the temperature of a component where the component is any one of the group comprising a furnace, a kiln, an incinerator or a machine bearing. Furthermore, the component is an element of a process of any one of the group comprising rapid thermal processing, molecular beam epitaxy, chemical vapour deposition, metal organic chemical vapour deposition, physical vapour deposition, materials processing or thermal shock testing.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of measuring temperature of a component capable of emitting thermal radiation and reflecting background radiation comprising the steps of:
   i) providing a pyrometer for measuring the radiation from the component, characterised by
   ii) coating a part of the component with a first emissivity coating and a part of the component with a different and second emissivity coating, each with known emissivities $E_H$ and $E_L$ respectively,
   iii) recording a first radiation measurement from the first emissivity coating $R_H$ and a second radiation measurement from the second emissivity coating $R_L$, iv) then calculating the true radiation $R_{Blade}$ from the component from the equation $$R_{Blade} = \frac{\left(\frac{R_H}{E_H} - \frac{R_L}{E_H}\left(\frac{1-E_H}{1-E_L}\right)\right)}{\left(1 - \frac{E_L}{E_H}\left(\frac{1-E_H}{1-E_L}\right)\right)}$$

and relate the $R_{Blade}$ value to the true component temperature by calibration of the pyrometer.

2. A method as claimed in claim 1 wherein the coatings of different emissivities are coated on an isotherm of the component and the pyrometer measures the radiation on the isotherm.

3. A method as claimed in claim 1 wherein a further coating of the same emissivity as one of the other coatings is coated on the component for a further calculation of the true radiation $R_{Blade}$.

4. A method as claimed in claim 1 wherein a further coating of different emissivity from either coating is coated on the component for a further calculation of the true radiation $R_{Blade}$.

5. A method as claimed in claim 1 wherein the component is a component of a gas turbine engine.

6. A method as claimed in claim 1 wherein the component is a component of any one of the group comprising a furnace, a kiln, an incinerator or a machine bearing.

7. A method as claimed in claim 1 wherein the component is a component of a process of any one of the group comprising rapid thermal processing, molecular beam epitaxy, chemical vapour deposition, metal organic chemical vapour deposition, physical vapour deposition, materials processing or thermal shock testing.

* * * * *